US009519533B2

United States Patent
Yoon et al.

(10) Patent No.: US 9,519,533 B2
(45) Date of Patent: Dec. 13, 2016

(54) DATA FLOW TRACKING VIA MEMORY MONITORING

(71) Applicant: QUALCOMM Incorporated, San Diego, CA (US)

(72) Inventors: Man Ki Yoon, Urbana, IL (US); Mastooreh Salajegheh, San Jose, CA (US); Mihai Christodorescu, San Jose, CA (US); Yin Chen, Campbell, CA (US); Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/607,251

(22) Filed: Jan. 28, 2015

(65) Prior Publication Data

US 2016/0217029 A1 Jul. 28, 2016

(51) Int. Cl.
| | | |
|---|---|---|
| *G06F 11/00* | (2006.01) | |
| *G06F 11/07* | (2006.01) | |
| *G06F 9/54* | (2006.01) | |
| *G06F 11/36* | (2006.01) | |

(Continued)

(52) U.S. Cl.
CPC ............ *G06F 11/0751* (2013.01); *G06F 9/54* (2013.01); *G06F 11/073* (2013.01); *G06F 11/36* (2013.01); *G06F 11/3604* (2013.01); *G06F 11/366* (2013.01); *G06F 11/3612* (2013.01); *G06F 11/3668* (2013.01); *G06F 21/52* (2013.01); *G06F 21/577* (2013.01)

(58) Field of Classification Search
CPC ... G06F 11/0751; G06F 11/36; G06F 11/3604; G06F 11/3612; G06F 11/366; G06F 11/3668; G06F 21/577
See application file for complete search history.

(56) References Cited

U.S. PATENT DOCUMENTS

| | | | |
|---|---|---|---|
| 7,788,235 B1 | 8/2010 | Yeo | |
| 7,870,610 B1 * | 1/2011 | Mitchell | ............. G06F 12/1441 726/22 |
| 7,958,558 B1 | 6/2011 | Leake et al. | |

(Continued)

OTHER PUBLICATIONS

Clause J., et al., "Effective Memory Protection Using Dynamic Tainting," ASE '07 Proceedings of the twenty-second IEEE/ACM international conference on Automated software engineering, 2007, 10 pages.

(Continued)

*Primary Examiner* — Philip Guyton
(74) *Attorney, Agent, or Firm* — The Marbury Law Group, PLLC

(57) ABSTRACT

Methods and devices for tracking data flows in a computing device include monitoring memory in a hardware component of the computing device to identify a read operation that reads information from a tainted memory address, using heuristics to identify a first, second, and third number of operations performed after the identified read operation, marking memory addresses of write operations performed after first number of operations and before the second number of operations as tainted, and marking memory addresses of write operations performed after the third number of operations and before the second number of operations as untainted.

20 Claims, 7 Drawing Sheets

(51) Int. Cl.
G06F 21/57 (2013.01)
G06F 21/52 (2013.01)

(56) References Cited

U.S. PATENT DOCUMENTS

| | | | |
|---|---|---|---|
| 8,074,281 | B2 | 12/2011 | Peinado et al. |
| 8,413,240 | B2* | 4/2013 | Katsunuma ............ G06F 21/54 |
| | | | 711/157 |
| 8,510,827 | B1 | 8/2013 | Leake et al. |
| 9,171,028 | B1* | 10/2015 | Collingbourne ........ G06F 11/34 |
| 2009/0183261 | A1* | 7/2009 | Peinado ................ G06F 21/565 |
| | | | 726/24 |
| 2011/0145918 | A1 | 6/2011 | Jung et al. |
| 2012/0317647 | A1 | 12/2012 | Brumley et al. |
| 2015/0128262 | A1* | 5/2015 | Glew .................... G06F 21/554 |
| | | | 726/23 |

OTHER PUBLICATIONS

International Search Report and Written Opinion—PCT/US2015/066442—ISA/EPO—Mar. 11, 2016.
Lin, Y-D., et al., "Embedded TaintTracker: Lightweight Tracking of Taint Data against Buffer Overflow Attacks", IEEInternational Conference OnCommunications (ICC), 2010, Piscataway, NJ, USA, May 23, 2010 (May 23, 2010), pp. 1-5, XP031702879, ISBN: 978-1-4244-6402-9 the whole document.

* cited by examiner

DATA FLOW TRACKING VIA MEMORY MONITORING

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of tracking data flows in a computing device, which may include monitoring memory to identify a read operation that reads information from a tainted memory address, determining an offset value (O) that identifies a first number of operations performed after the identified read operation, a monitoring window value (M) that identifies a second number of operations performed after the first number of operations, and an upper boundary value (N) that identifies a third number of operations performed after the first number of operations, monitoring operations until one of M operations are performed and N write operations to untainted addresses are identified, marking memory addresses associated with identified write operations as tainted, and marking memory addresses associated with write operations performed after the Nth operation and memory addresses associated with write operations performed after the Mth operation as untainted.

In an aspect, the method may include using heuristics to identify the first (O), second (M) and third (N) number of operations. In a further aspect, the method may include identifying a software application that reads information from one of the tainted memory addresses, and applying behavior information collected in the computing device to boosted decision stumps in a classifier model to determine whether the software application is non-benign. In a further aspect, the method may include identifying a first software application that reads information from one of the tainted memory addresses, and monitoring application programming interface calls made by the first software application.

In a further aspect, the method may include generating a behavior vector information structure based on the monitored API calls, applying the behavior vector information structure to a classifier model to generate behavior-based analysis results, and using the behavior-based analysis results to determine whether the first software application is non-benign. In a further aspect, the method may include identifying a second software application that reads information from one of the tainted memory addresses, and monitoring application programming interface calls made by the second software application.

In a further aspect, the method may include generating a behavior vector information structure based on a combination of API calls made by the first and second software applications, applying the behavior vector information structure to a classifier model to generate behavior-based analysis results, and using the behavior-based analysis results to determine whether behavior of the first and second software applications is non-benign. In a further aspect, generating the behavior vector information structure based on the combination of API calls made by the first and second software applications may include generating an information structure that characterizes a collective behavior of the first and second software applications. In a further aspect, generating the behavior vector information structure based on the combination of API calls made by the first and second software applications may include generating an information structure that characterizes a relationship between the first and second software applications.

Further aspects may include a non-transitory computer readable storage medium having stored thereon processor-executable software instructions configured to cause a processor of a computing device to perform operations that include monitoring memory to identify a read operation that reads information from a tainted memory address, determining an offset value (O) that identifies a first number of operations performed after the identified read operation, a monitoring window value (M) that identifies a second number of operations performed after the first number of operations, and an upper boundary value (N) that identifies a third number of operations performed after the first number of operations, monitoring operations until one of M operations are performed, and N write operations to untainted addresses are identified, marking memory addresses associated with identified write operations as tainted, and marking memory addresses associated with write operations performed after the Nth operation and memory addresses associated with write operations performed after the Mth operation as untainted.

In an aspect, the stored processor-executable software instructions may be configured to cause a processor to perform operations that further include using heuristics to identify the first, second and third number of operations. In a further aspect, the stored processor-executable software instructions may be configured to cause a processor to perform operations that further include identifying a software application that reads information from one of the tainted memory addresses, and applying behavior information collected in the computing device to boosted decision stumps in a classifier model to determine whether the software application is non-benign. In a further aspect, the stored processor-executable software instructions may be configured to cause a processor to perform operations that further include identifying a first software application that reads information from one of the tainted memory addresses, and monitoring application programming interface calls made by the first software application.

In a further aspect, the stored processor-executable software instructions may be configured to cause a processor to perform operations that further include generating a behavior vector information structure based on the monitored API calls, applying the behavior vector information structure to a classifier model to generate behavior-based analysis results, and using the behavior-based analysis results to determine whether the first software application is non-benign. In a further aspect, the stored processor-executable software instructions may be configured to cause a processor to perform operations that further include identifying a second software application that reads information from one of the tainted memory addresses, and monitoring application programming interface calls made by the second software application.

In a further aspect, the stored processor-executable software instructions may be configured to cause a processor to perform operations further including generating a behavior vector information structure based on a combination of API calls made by the first and second software applications, applying the behavior vector information structure to a classifier model to generate behavior-based analysis results, and using the behavior-based analysis results to determine whether behavior of the first and second software applications is non-benign. In a further aspect, the stored processor-executable software instructions may be configured to cause a processor to perform operations such that generating the behavior vector information structure based on the combination of API calls made by the first and second software applications includes generating an information structure that characterizes a collective behavior of the first and second software applications. In a further aspect, the stored processor-executable software instructions may be configured to cause a processor to perform operations such that generating the behavior vector information structure based on the combination of API calls made by the first and second software applications includes generating an information structure that characterizes a relationship between the first and second software applications.

Further aspects include a computing device that includes a processor configured with processor-executable instructions to perform operations that may include monitoring memory to identify a read operation that reads information from a tainted memory address, determining an offset value (O) that identifies a first number of operations performed after the identified read operation, a monitoring window value (M) that identifies a second number of operations performed after the first number of operations, and an upper boundary value (N) that identifies a third number of operations performed after the first number of operations, monitoring operations until one of M operations are performed, and N write operations to untainted addresses are identified, marking memory addresses associated with identified write operations as tainted, and marking memory addresses associated with write operations performed after the Nth operation and memory addresses associated with write operations performed after the Mth operation as untainted.

In an aspect, the processor may be configured with processor-executable instructions to perform operations further including identifying a first software application that reads information from one of the tainted memory addresses, monitoring application programming interface calls made by the first software application, generating a behavior vector information structure based on the monitored API calls, applying the behavior vector information structure to a classifier model to generate behavior-based analysis results, and using the behavior-based analysis results to determine whether the first software application is non-benign.

Further aspects include a computing device having various means for performing functions of the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
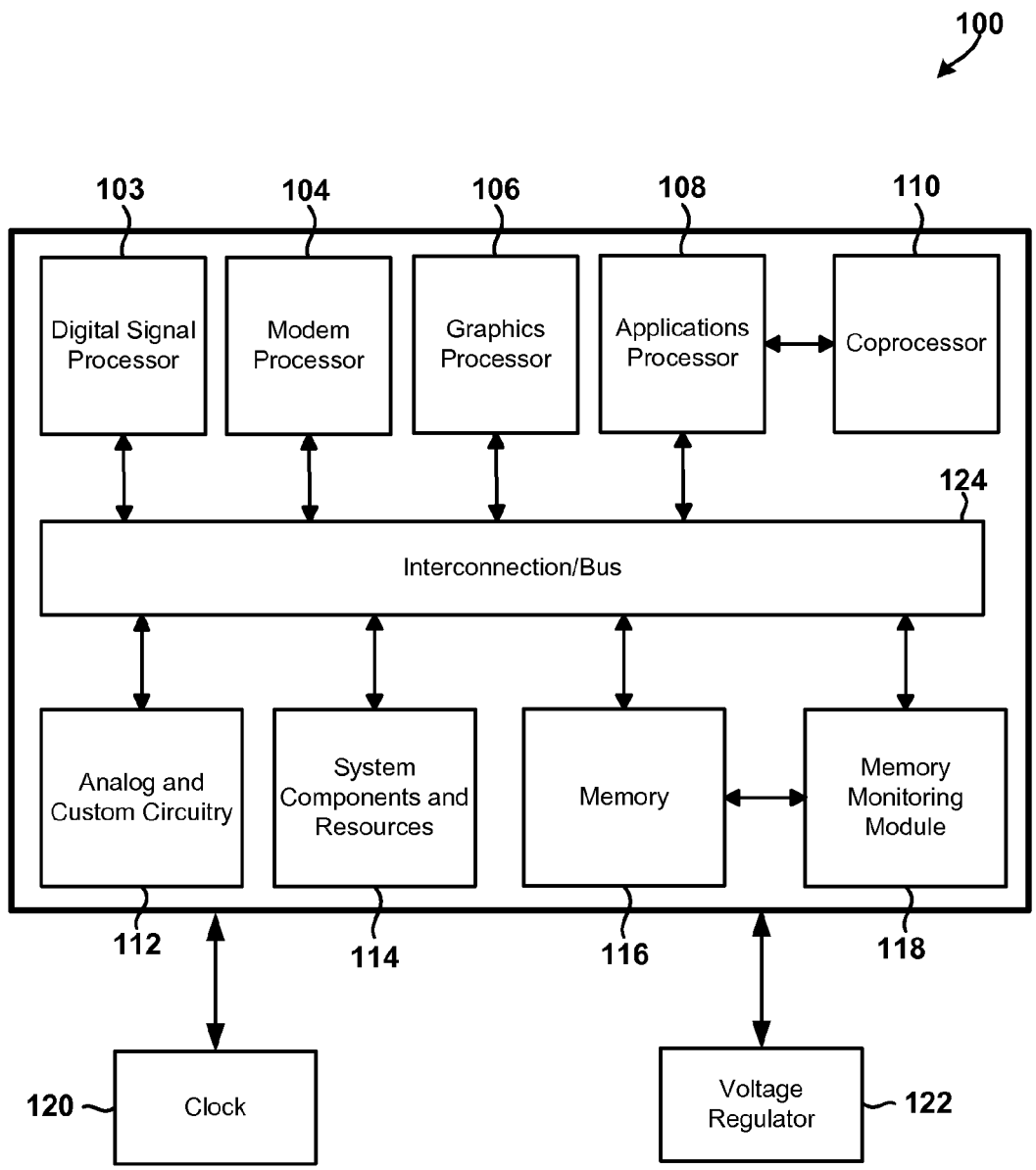
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods of using heuristics and machine learning techniques to provide efficient data tracking solutions that are suitable for use by mobile and resource-constrained computing devices to quickly and efficiently identify software applications that are using data improperly (e.g., reading address book data and sending it to a server) and/or software applications that are otherwise non-benign (e.g., malicious, poorly written, incompatible with the device, etc.).

In an aspect, a computing device may be pre-configured with information that identifies or enables the computing device to select memory addresses that should be afforded close monitoring. The computing device may be configured to mark the selected memory addresses as "tainted" (e.g., by adding the memory addresses to a taint list), monitor behaviors, activities, or operations in the computing device to identify software applications that read information from a tainted memory address (i.e., a memory address marked as tainted), classify the identified software applications as requiring close monitoring or additional scrutiny, apply a taint-propagation heuristic to identify additional memory addresses that should be marked as tainted and/or to identify tainted memory addresses that should be "untainted" (e.g., removed from the taint list, marked as no longer requiring close monitoring, etc.). The computing device may then monitor the tainted memory addresses to identify additional software applications that require close monitoring or additional scrutiny. In an aspect, the monitoring of memory access operations following a tainted address access (e.g., operations that write or read information to or from a tainted memory, etc.) may be performed in a hardware module for a set or configurable number of operations. These operations may be performed repeatedly or continuously in the computing device to identify non-benign software applications without imposing a significant negative impact on the performance or power consumption characteristics of the device.

In an aspect, the computing device may be configured to monitor its memories to identify a read operation that reads information from a tainted memory address. In an aspect, this monitoring of read operations may be performed in software, such as part of a behavior monitoring system. In response identifying such a read operation, the computing device may use a taint propagation heuristic to compute or determine a first number of operations (e.g., an "offset" or "O" number of operations), a second number of operations (e.g., a monitoring window or an "M" number of operations), and a third number of operations (e.g., an upper boundary or "N" number of operations).

The first number of operations (O) may identify the number of operations after the detected read operation that the computing device could ignore before it commences marking memory addresses as tainted. Before the offset number of operations (O) the likelihood of a malicious operations writing to another memory address is low, so the computing device (e.g., the memory monitoring module) could determine to not begin marking memory addresses until after the O'th operation to conserve processing and battery resources. The second number of operations (M) may identify a monitoring window by identifying the number of operations (e.g., read, write, add, shift, branch, etc.) after the O'th operation that the computing device may monitor for write operations. The third number of operations (N) may define an upper boundary for the number of write operations within the monitoring window (e.g., in the M number of operations) that the computing device may mark as tainted.

As an illustrative example, the computing device may use the taint propagation heuristic to determine that the values of O, M, and N should be 10, 100 and 4, respectively. The computing device may then identify a read operation that reads information from a tainted memory address, ignore the first 10 operations (i.e., O operations) performed after the detected read operation, and monitor the next 100 operations (i.e., M operations) to identify the first 4 write operations (i.e., first N operations) to untainted addresses. The computing device may stop monitoring write operations to untainted addresses after it identifies the 4th (i.e., Nth) write operation in the monitoring window or after the 100 operations of the monitoring window have been performed, whichever occurs first. For example, if there are only three (3) write operations in the 100 operations of monitoring window, the computing device will monitor all 100 operations. On the other hand, if the second, fourth, eighth, and tenth operations in the monitoring window are write operations to untainted addresses, the computing device will stop monitoring operations to untainted addresses after the tenth operation (i.e., after the Nth operation). The computing device may mark the memory addresses associated with these identified write operations (up to N operations) in the monitoring window as tainted. In addition, the computing device may mark all write operations that occur after the Nth write operation (e.g., after the $4^{th}$ operation in the above example) as untainted, regardless of whether the write operations occur within the monitoring window (M). Said another way, the computing device may mark all write operations performed after the Nth operation in the monitoring window (M) and all write operations outside of the monitoring window (M) as untainted.

In an aspect, the monitoring of memory access operations may be performed in a hardware component of the computing device. A software module recognizing that a tainted address has been read may trigger a memory monitoring hardware module (e.g., via an application programming interface (API) instruction) to begin monitoring memory operations after O operations until M operations are performed. Alternatively or in addition, the same or different components in the computing device may monitor all memory read and write operations to tainted memory addresses, identify writes to tainted memory addresses, and mark these memory addresses as untainted.

By implementing and using the above-described taint propagation heuristic, the computing device may track data as it is flows through the system without any modifications to its runtime system. Since such modifications to the runtime system (required by conventional solutions) may have a significant and negative impact on the performance and power consumption characteristics of the computing device, the use of the taint propagation heuristic may improve the functioning of the computing device (e.g., by improving its performance and power consumption characteristics). In addition, by using the taint propagation heuristic, the computing device may track data as it flows through the system (e.g., between a source component and a sink component) by identifying read and write operations to select memory addresses. This allows the computing device to track the data flows without performing complex or power-intensive operations, such as operations for annotating, marking, or tagging data with identifiers or tracking/taint information (which is required by conventional data flow tracking solutions). This further improves the performance and power consumption characteristics of the computing device.

As the term is used herein, a "source component" refers to any component that generates and/or inputs data into a software application being evaluated. Examples of source components include files, software applications (e.g., an address book application, etc.), remote processes, external servers, system services, etc. A "sink component" refers to any component that consumes or uses the data after it is processed by the software application. Examples of sink components include files, databases, electronic displays, network connections, and transmission points such as the Internet, HTTP, text messages, a Bluetooth® transceiver, etc.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important. While the various aspects are particularly useful for mobile computing devices that have limited resources and run on battery power, such as smartphones, the aspects are generally useful in any electronic device that includes a processor and executes application programs.

The term "runtime system" is used herein to refer to a combination of software and/or hardware resources in a computing device that support the execution of an application program in that device. For example, a runtime system may include all or portions of the computing device's processing resources, operating systems, library modules, schedulers, processes, threads, stacks, counters, and/or other similar components. A runtime system may be responsible for allocating computational resources to an application program, for controlling the allocated resources, and for performing the operations of the application program.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, applications and conditions that degrade performance for any of these reasons are referred to herein as "non-benign" or "non-benign."

Generally, the performance, power efficiency, and security of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

In the various aspects, a computing device (e.g., a mobile or resource-constrained computing device) may be equipped with a behavior-based security system that is configured to use behavioral analysis and machine learning techniques to intelligently and efficiently identify, prevent, and/or correct the conditions, factors, and/or behaviors that often degrade a computing device's performance and/or power utilization levels over time. For example, the behavior-based security system may use behavioral analysis techniques to quickly and efficiently determine whether a software application, process, activity, or device behavior is benign or non-benign. The behavior-based security system may then cause the computing device to perform various actions or operations to correct, heal, cure, isolate, or otherwise fix the identified problems (e.g., behaviors determined to be non-benign).

While the above-mentioned behavior-based security system is generally very effective for preventing the degradation in performance and power utilization levels of a computing device over time, certain non-benign behaviors may evade detection by such systems. Further, malicious software applications might attempt to circumvent or evade detection by such a system by delaying their operations, working in concert, or otherwise masking the malicious activities. For example, when stealing information from a user's address book, a malicious software application might attempt to evade detection by accessing the address book, encoding the address book information, and storing the encoded information in a discrete file that is separate from the address book files. The malicious application may then wait a few days before retrieving the information from the discrete file and sending the information to a server, or a second malicious application may retrieve and send the information to the server.

Typically, the behavior-based security system would be able to determine that the above-described sequence of operations (e.g., reading, storing, and transmitting the address book data) is inconsistent with normal operating patterns of the device, and classify this behavior as non-benign. However, since the operations are performed over a relatively long period of time and/or by multiple software applications working in concert, the behavior-based security system may fail to identify these operations as being a part of the same sequence or behavior.

A computing device may overcome the above-mentioned limitations by implementing and using a data flow tracking solution in conjunction with the behavior-based security system. Briefly, data flow tracking solutions, such as Flow-Droid, provide a mechanism for determining whether data generated by a sensitive source component reaches a sink component that is of importance (i.e., a component determined to be susceptible to abuse, marked as important, etc.). Using conventional solutions, the data is annotated, marked, or tagged with identifiers (e.g., tracking or taint information). These identifiers are replicated by each intermediate component that processes, uses, or communicates the data, and the sink component uses these identifiers to determine whether the data originates from an authorized, trusted, approved, or appropriate source component.

As an example, a source component in the computing device may associate a source ID value to each unit of data that it produces, generates, or communicates. Each intermediate component that processes that unit of data may communicate the source ID value along with the data unit, so that both the data unit and its source ID value propagate through the system until they are received in the sink component. The sink component may use the source ID value to determine whether the data unit originates from an authorized, trusted, approved, or otherwise appropriate source component. The computing device may generate an error message or throw an exception in response to determining that the data unit is not associated with an authorized, trusted, or approved source component.

While the above-mentioned data flow tracking solution is generally effective for identifying non-benign software applications, it is not suitable for use in many modern computing devices (e.g., mobile devices, etc.). This is because modern computing devices are highly configurable and complex systems, and include many components that perform a large numbers of operations (reads, writes, data encoding, data transmissions, etc.). As a result, there may be a large number of data flows that require monitoring in the computing device, and each of these data flows may include a large number of data units that propagate through many different intermediate components. Using a conventional data flow tracking solution, the computing device might be required to mark, monitor, track, or evaluate many or all of these data units. Often, this requires that the computing device perform a large number of complex and power-intensive operations. Such operations may have a significant and negative impact on the performance and power consumption characteristics the device.

A computing device may overcome the above-mentioned limitations by implementing and using a taint tracking solution that reduces the number of data flows that require tracking and/or reduces the number of data units that require marking, monitoring, tracking, and evaluating when analyzing device behaviors.

Generally, taint tracking is a data flow tracking technique in which the computing device's runtime system or virtual machine is modified to mark certain components, operations, or memory locations as "tainted." The runtime system or virtual machine may then monitor the tainted components, operations, or memory locations to identify components that use these tainted resources. For example, the computing device may be configured to mark a memory location that is used by a sensitive source component as tainted, and monitor the tainted memory location to identify an intermediate software application or process that reads information from tainted memory, mark the memory locations used by the identified intermediate application/process as tainted, and so on. This allows the system to identify non-benign behaviors that would otherwise evade detection by the behavior-based security, such as software applications that are working in concert. This also allows the computing device to focus its operations on monitoring a select number of components, operations, or memory locations in the device so as to reduce the number of complex and power-intensive operations that are required to be performed when tracking a data flow.

While taint tracking solutions overcome some of the limitations of more conventional data flow tracking solutions, existing taint tracking solutions are not suitable for use as part of a behavior-based security solution in many modern computing devices. First, conventional taint tracking solutions require modifications to the computing device's runtime system or virtual machine, and such modifications may have a significant and negative impact on the performance and power consumption characteristics of the computing device. In addition, many conventional taint tracking solutions require marking all the components, operations and memory locations associated with a tainted component as also being tainted, but do not intelligently determine whether these tainted resources should be reclassified as untainted. As a result, the continued or repeated use of these solutions over time may require that the computing device identify, mark, tag, monitor, and/or track a large number of components, which may render the computing device non-responsive. Further, many existing solutions require that the computing device use duplicated variables as metadata and/or implement entire or additional instruction sets in order to dynamically propagate the identifiers (i.e., the tracking/taint information) on every store instruction, which may consume a significant amount of the device's processing, power, or memory resources.

For all the above-described reasons, conventional taint tracking solutions are not suitable for use in modern computing devices, such as mobile devices, which are resource-constrained devices that have limited memory, power, and processing resources. These solutions are also not suitable for use as part of a comprehensive behavior-based security system that continuously or repeatedly monitors and analyzes a large number of device behaviors, because the continued or repeated use of these existing solutions may render the computing device non-responsive.

The various aspects include methods, and computing devices configured to implement the methods, of using heuristics and machine learning techniques to implement and provide improved data tracking solutions (e.g., improved taint tracking solutions, etc.) that overcome the above-mentioned limitations of existing solutions and are suitable for use as part of a behavior-based security system of a resource-constrained computing device.

Unlike conventional solutions, the various aspects include data tracking solutions that do not require the computing device to tag or track large volumes of data as memory accesses, data transformation operations, memory write operations flow data through the system. The various aspects allow the computing device to use a taint-propagation heuristic to determine whether a memory location should be marked as tainted or untainted. This allows the device to intelligently track data as it flows through the system, and identify the device behaviors, features, or software applications that require additional or more detailed monitoring, analysis, or scrutiny, without having a significant negative impact on its performance and power consumption characteristics. By reducing the volume of data that must be tracked to implement the method, the various aspects may be implemented at least partially in hardware (e.g., a memory monitoring module) in order to reduce the processing overhead of such monitoring.

In some aspects, the behavior-based security system may be a behavioral monitoring and analysis system that is configured to efficiently identify non-benign software applications (e.g., applications that are malicious, poorly written, incompatible with the device, etc.) and prevent such applications from degrading the device's performance and/or power utilization levels over time. The behavioral monitoring and analysis system may include an observer process, daemon, module, or sub-system (herein collectively referred to as a "module") configured to instrument or coordinate various application programming interfaces (APIs), registers, counters or other components (herein collectively "instrumented components") at various levels of the computing device system. The observer module may continuously (or near continuously) monitor device behaviors by collecting behavior information from the instrumented components, which may be accomplished by reading information from log files (e.g., API logs) stored in a memory of the device. The behavioral monitoring and analysis system may also include an analyzer module, and the observer module may communicate (e.g., via a memory write operation, function call, etc.) the collected behavior information to the analyzer module. The analyzer module may receive and use the behavior information to perform behavior analysis operations, which may include performing, executing, and/or applying data, algorithms, classifiers and/or models to determine whether a device behavior is benign or non-benign/performance-degrading.

In an aspect, the computing device may be configured to use aspect data tracking solutions as part of the comprehensive behavioral monitoring and analysis system to generate security policies and/or to identify the components or features that require closer or additional monitoring or analysis. For example, the behavioral monitoring and analysis system may identify, measure, monitor, and/or analyze select control flow and/or runtime parameters, then use the results of these operations to compute a probability value that identifies the likelihood that data received in a sink component is from a sensitive or protected source component that requires closer monitoring or additional scrutiny. This allows the computing device to analyze only select runtime parameters (as opposed to tracking entire data flows) to identify sensitive data and focus its monitoring and analysis operations on evaluating the most important features of the computing device. This improves the speed, responsiveness, and overall performance the device (e.g., by improving the performance of the behavior-based security system, etc.).

In an aspect, the computing device may be configured to use machine learning techniques and heuristics to generate, update, and/or train the data, algorithms, classifiers and/or behavior models, which may be used by the behavioral monitoring and analysis system to identify a software application that is non-benign (e.g., malicious, poorly written, incompatible with the device, etc.) without tagging or tracing the data as is required when using conventional data flow tracking solutions. For example, the computing device processor may be configured with processor-executable instructions to run/execute a software application, identify all of the data source and sink points or components used by the application, collect and store heuristic values and ground truth values (e.g., "a data leak occurred", etc.) for each identified point/component, use the heuristic value to determine whether a memory location should be marked as tainted or untainted, monitor tainted memory address to identify software applications that read or write information to a tainted memory address, and determine whether the identified software applications are benign or non-benign.

In various aspects, the computing device may be configured to track a data flow through multiple threads of a multithreaded software application and/or in multiple concurrent executions of an application. In an aspect, this may be accomplished by the device implementing and using per thread-heuristic counters for each thread or process. In an aspect, the computing device may generate and maintain separate heuristics for each thread. For background threads and thread pools, the device may be configured to maintain, restore, or save a counter for each task/process each time it is scheduled/executed so that the threads in a thread pool do not erroneously share heuristic values across tasks (which would skew the accuracy amongst unrelated tasks that shared a thread).

In an aspect, the computing device may be configured to quickly and efficiently determine whether sensitive information is being leaked (i.e., being used improperly or by an unauthorized component, etc.) from a source component to a sink component without consuming an excessive amount of the device's processing, power, or memory resources. This may be accomplished via the device processor identifying a first memory address associated with a sensitive source component, identifying a second memory address associated with a sink component, and determining whether the first memory address is the same as the second memory address. For example, after identifying a source component (e.g., gps_location, etc.) and a sink component (e.g., sendsms(msg)), the computing device processor may compare the address of the sink argument (e.g., "msg" in "sendsms (msg)," "a" in "send(a)," etc.) to the address of the source component to determine whether the addresses match (e.g., are the same, equal, equivalent, etc.). The device processor may determine that an information leak has occurred in response to determining that the first memory address is the same as the second memory address. The computing device may also identify components that use or are associated with the source or the sink (and thus require closer scrutiny or deeper analysis) in response to determining that the addresses of the source and sink components match (i.e., first memory address is the same as the second memory address). The computing device may then respond to the information leak, such as by quarantining application programs that read or write information to the identified addresses, application programs that use the source or sink components, etc.

The various aspects may be implemented in a number of different computing devices, including single processor and multiprocessor systems. FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 103, a modem processor 104, a graphics processor 106, and an application processor 108. The SOC 100 may also include one or more coprocessors 110 (e.g., vector co-processor) connected to one or more of the heterogeneous processors 103-108.

Each processor 103-110 may include one or more cores, and each processor/core may perform operations independent of the other processors/cores. Further, each processor 103-108 may include an operating system that performs memory management operations independent of the other operating systems and processors in the system. For example, the multiprocessor system may include a first processor that executes a first type of operating system (e.g., FreeBSD, LINUX, OS X, etc.) and a second processor that executes a second type of operating system (e.g., Microsoft Windows 10, etc.). Each of these operating systems may include a memory management system for managing the allocation and use of system memory 116 by application programs executing on that processor 103-108. For example, each operating system may include a virtual memory manager (OS VMM) configured to allocate virtual memory addresses to the application programs and ensure that memory used by one process does not interfere with memory already in use by another process. When a process requires access to the physical memory, these virtual addresses may be translated to physical memory addresses by a memory management unit (MMU) that is specific to that processor 103-108.

The SOC 100 may include a memory monitoring module 118 that maintains a list of tainted memory addresses, monitors the memory 116 to identify read and write operations associated with tainted memory addresses, identifies and collects information on the operations that performed after information is read from a tainted memory address, and communicates any or all such information to one or more software modules of the computing device.

The SOC 100 may also include analog circuitry and custom circuitry 112 for managing sensor data, analog-to-digital conversions, wireless data transmissions, and for performing other specialized operations, such as processing encoded audio signals for games and movies. The SOC 100 may include system components and resources 114, such as voltage regulators, oscillators, phase-locked loops, peripheral bridges, data controllers, memory controllers, system controllers, access ports, timers, and other similar components used to support the processors and clients running on a computing device. The resources/system components 114 and custom circuitry 112 may include circuitry to interface with peripheral devices, such as cameras, electronic displays, wireless communication devices, external memory chips, etc.

The processors 103-108 may be interconnected to the memory 116 elements, the memory monitoring module 118, resources and custom circuitry 112 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC 100, such as a clock 120 and a voltage regulator 122. Resources external to the SOC (e.g., clock 120, voltage regulator 122) may be shared by two or more of the internal SOC processors/cores (e.g., DSP 103, modem processor 104, graphics processor 106, applications processor 108, etc.).

The SOC 100 may also include hardware and/or software components suitable for interfacing with speakers, receiving inputs from user interface elements (e.g., input buttons, touch screen display, etc.), receiving audio data from microphone arrays, and collecting sensor data from sensors including sensors for monitoring physical conditions (e.g., location, direction, motion, orientation, vibration, pressure, etc.), cameras, compasses, GPS receivers, communications circuitry (e.g., Cellular, Bluetooth®, WLAN, WiFi, etc.), and other well known components (e.g., accelerometer, gyroscopes, etc.) of modern electronic devices.

The processors 103-108 may be independent processing cores that are in close proximity (e.g., on a single substrate, die, integrated chip, etc.) to one another. The proximity of the processors 103-108 allows for the sharing of on-chip memory 116 and for more coordinated cooperation between cores. In addition, the proximity of the processors 103-108 also allows the memory 116 to operate at a much higher frequency/clock-rate than is possible if data signals have to travel off-chip.

Figure 2:
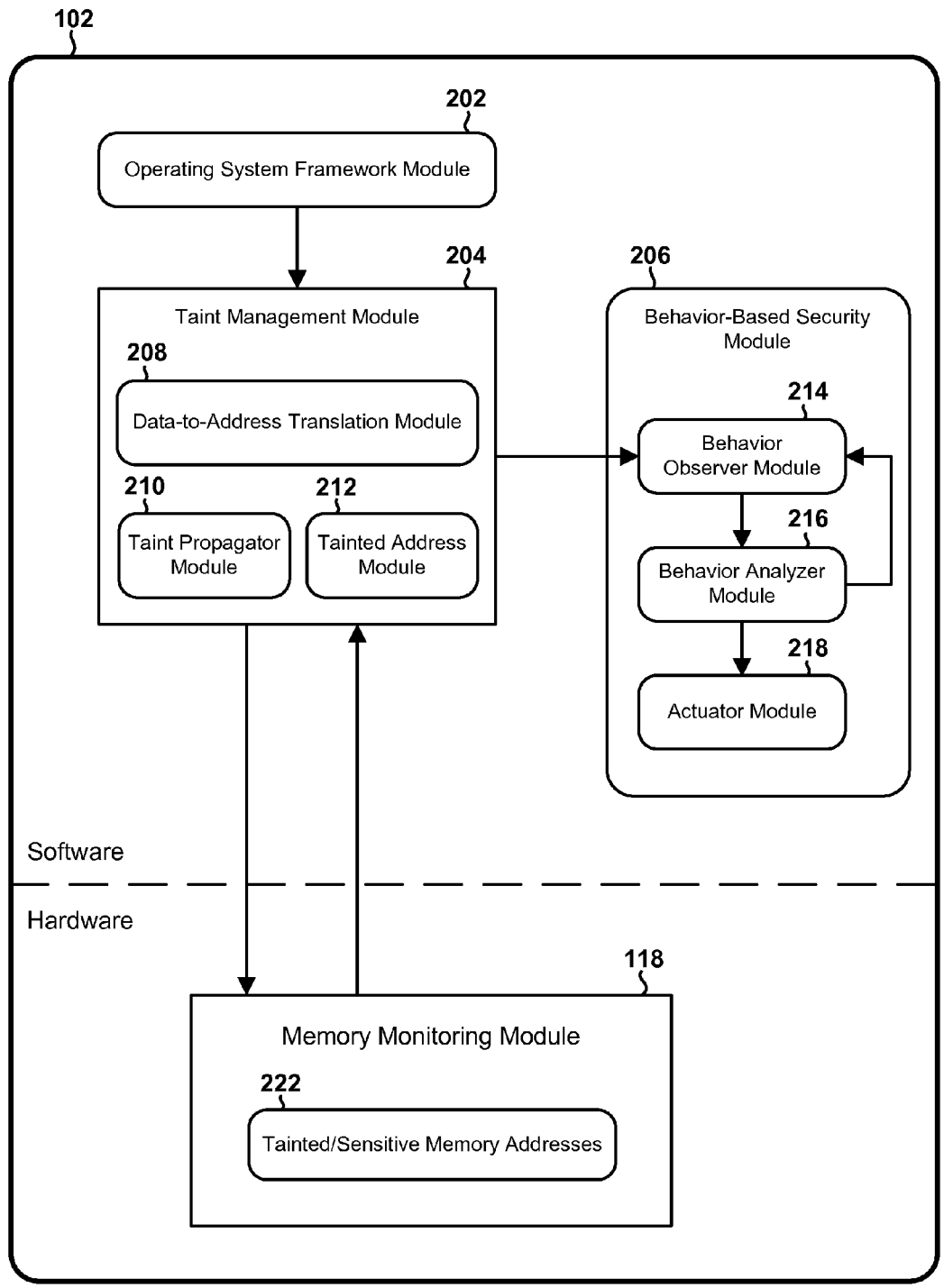
FIG. 2 is a block diagram illustrating example logical components and information flows in an aspect mobile device configured track data flows in accordance with an aspect.

FIG. 2 illustrates example logical components and information flows that may be implemented in a processor of an aspect mobile device 102 configured to determine whether a particular mobile device behavior, software application, or process is non-benign (i.e., malicious, performance-degrading, or suspicious). In the example illustrated in FIG. 2, the mobile device 102 includes both hardware and software components.

The hardware component may include a memory monitoring module 118 that includes/stores a list of tainted/sensitive memory addresses 222. The software components may include an operating system framework module 202, a taint management module 204, and a behavior-based security module 206. The taint management module 204 may include a data-to-address translation module 208, a taint propagator module 210, and a tainted address module 212. The behavior-based security module 206 may include a behavior observer module 214, a behavior analyzer module 216, and an actuator module 218.

The operating system framework module 202 may send an initial list of sensitive components that require close monitoring. The taint management module 204 may mark the memory addresses used by these sensitive components as "tainted." This may be accomplished by generating a taint list that includes the memory address used by a sensitive component, and sending the taint list to the memory monitoring module 118.

The memory monitoring module 118 may be configured to receive the taint list from the taint management module 204, and update its list of tainted/sensitive memory addresses 222. The memory monitoring module 118 may monitor the device's memory to detect a read operation that reads information from a memory address included in the list of tainted/sensitive memory addresses 222. The memory monitoring module 118 may collect information on the operations that are performed after the detected read operation, generate an operations list that includes these operations, and send the list to the taint management module 204.

The taint management module 204 may receive the operations list from the memory monitoring module 118, use a taint propagation heuristic to compute or determine a first number of operations (O), a second number of operations (M), and a third number of operations (N) of operations. As described above, the first number of operations (O) may identify the number of operations after the detected read operation that the computing device could ignore before it commences marking memory addresses as tainted. The second number of operations (M) may identify a monitoring window by identifying the number of operations (e.g., read, write, add, shift, branch, etc.) after the O'th operation that the computing device may monitor for write operations. The third number of operations (N) may define an upper boundary for the number of write operations within the monitoring window (e.g., in the M number of operations) that the computing device may mark as tainted.

After determining the O, M, and N values, the taint management module 204 may update the taint list to include memory addresses associated with the first N write operations performed between the O'th operation and the M'th operation, remove from the taint list the memory addresses that are associated with the write operations performed after the N'th detected write operation or after the M'th operation, whichever occurs first. The taint management module 204 may also identify software applications that read or write information to tainted memory addresses, and send this information to the behavior-based security module 206. These operations may be performed repeatedly or continuously to identify sources or causes of performance degrading behaviors without having a significant negative impact on the performance or power consumption characteristics of the mobile device 102.

The behavior observer module 214 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 216. In various aspects, the generated observations may be stored as a behavior vector and/or in an API log file or structure.

In the various aspects, the behavior observer module 214 may monitor/observe mobile device operations and events by collecting information pertaining to reads/writes to tainted memory address, library API calls in an application framework or run-time libraries, system call APIs, file-system and networking sub-system operations, device (including sensor devices) state changes, and other similar events. The behavior observer module 214 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 214 may also monitor/observe data network activity, which may include types of connections, protocols, port numbers, server/client that the device is connected to, the number of connections, volume or frequency of communications, etc. The behavior observer module 214 may monitor phone network activity, which may include monitoring the type and number of calls or messages (e.g., SMS, etc.) sent out, received, or intercepted (e.g., the number of premium calls placed).

The behavior observer module 214 may also monitor/observe system resource usage, which may include monitoring the number of forks, memory access operations, number of files open, etc. The behavior observer module 214 may monitor the state of the mobile device, which may include monitoring various factors, such as whether the display is on or off, whether the device is locked or unlocked, the amount of battery remaining, the state of the camera, etc. The behavior observer module 214 may also monitor inter-process communications (IPC) by, for example, monitoring intents to crucial services (browser, contracts provider, etc.), the degree of inter-process communications, pop-up windows, etc.

The behavior observer module 214 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 214 may also monitor/observe one or more hardware counters that denote the state or status of the mobile computing device and/or mobile device sub-systems. A hardware counter may include a special-purpose register of the processors/cores that is configured to store a count value or state of hardware-related activities or events occurring in the mobile computing device.

The behavior observer module 214 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 214 may also monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 214 may also monitor/observe usage of and updates/changes to compass information, mobile device settings, battery life, gyroscope information, pressure sensors, magnet sensors, screen activity, etc. The behavior observer module 214 may monitor/observe notifications communicated to and from a software application (AppNotifications), application updates, etc. The behavior observer module 214 may monitor/observe conditions or events pertaining to a first software application requesting the downloading and/or install of a second software application. The behavior observer module 214 may monitor/observe conditions or events pertaining to user verification, such as the entry of a password, etc.

The behavior observer module 214 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle-to-vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

The behavior observer module 214 may be configured to generate behavior vectors that include a concise definition of the observed behaviors. Each behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the behavior observer module 214 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in an aspect, the behavior observer module 214 may be configured to perform coarse observations by monitoring/observing an initial set of behaviors or factors that are a small subset of all factors that could contribute to the mobile device's degradation. In various aspects, the behavior observer module 214 may receive the initial set of behaviors and/or factors from other mobile devices, a network server, or a component in a cloud service or network. In an aspect, the initial set of behaviors/factors may be specified in data/behavior models received from the other mobile device, network server or cloud service/network. In an aspect, the initial set of behaviors/factors may be specified in a reduced feature model (RFMs).

The behavior analyzer module 216 may receive the observations, behavior vectors, and/or collected behavior information from the behavior observer module 214, compare the received information (i.e., observations) with contextual information, and identify subsystems, processes, and/or applications associated with the received observations that are contributing to (or are likely to contribute to) the device's degradation over time, or which may otherwise cause problems on the device.

In an aspect, the behavior analyzer module 216 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 216 may be configured to analyze information (e.g., in the form of observations) collected from various modules, learn the normal operational behaviors of the mobile device, and generate one or more behavior vectors based the results of the comparisons. The behavior analyzer module 216 may send the generated behavior vectors to an actuator module, which may perform various operations to operations to heal, cure, isolate, or otherwise fix the identified problem.

The behavior analyzer module 216 may receive the behavior vectors and compare them to one or more behavior modules to determine whether a particular mobile device behavior, software application, or process is non-benign (e.g., performance-degrading/malicious), benign, or suspicious. When it is determined that a behavior, software application, or process is malicious or performance-degrading, the behavior analyzer module 216 may notify the actuator module 218, which may perform various actions or operations to correct mobile device behaviors determined to be non-benign, malicious or performance-degrading and/or perform operations to heal, cure, isolate, or otherwise fix the identified problem.

When the behavior analyzer module 216 determines that a behavior, software application, or process is suspicious, the behavior analyzer module 216 may notify the behavior observer module 214, which may adjust the adjust the granularity of its observations (i.e., the level of detail at which mobile device behaviors are observed) and/or change the behaviors that are observed based on information received from the behavior analyzer module 216 (e.g., results of the real-time analysis operations), generate or collect new or additional behavior information, and send the new/additional information to the behavior analyzer module 216 for further analysis/classification. Such feedback communications between the behavior observer module 214 and the behavior analyzer module 216 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

Thus, the behavior analyzer module 216 may be configured to receive the coarse observations from the behavior observer module 214 and identify subsystems, processes, and/or applications associated with the received coarse observations that may potentially contribute to the mobile device's degradation. This may be achieved by, for example, the behavior analyzer module 216 comparing the received information with contextual information received from the external components.

The behavior analyzer module 216 may instruct the behavior observer module 214 to perform or enable deeper logging/observations or final logging on the identified subsystems, processes or applications. The behavior observer module 214 may perform deeper observations on the identified subsystems, processes or applications. The behavior observer module 214 may send the results of the deeper observations to the behavior analyzer module 216 for further (and deeper) analysis. These operations may be repeated until the source of a problem is identified or until it is determined that the identified subsystems, processes or applications are not likely to cause problems or degradation. The behavior analyzer module 216 may then send the results of the analysis to the actuator module 218, which may receive the results and perform operations to heal, cure, isolate, or otherwise fix the identified problem.

The behavior observer module 214 and the behavior analyzer module 216 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 214 enables the computing system 200 to efficiently identify and prevent problems from occurring on mobile devices without requiring a large amount of processor, memory, or battery resources on the device.

The behavior observer module 214 may provide the system with various observer modes to enable multi-level logging (e.g., fine grained and coarse-grained logging). The behavior observer module 214 may provide the ability to automatically and dynamically switch between the different observer modes. The behavior observer module 214 may monitor and restrict process/application that may exhaust system resources. The behavior observer module 214 may manage communications (e.g., non-secure to secure world)

overhead, such that the overhead is minimal and flow control is maintained/performed efficiently.

In an aspect, the behavior observer module 214 may be configured to store the behavior information as observations in a space efficient and query-service-time efficient manner to reduce the performance-impact on benign applications and the mobile device.

In various aspects, the behavior observer module 214 and/or the behavior analyzer module 216 may be configured to analyze mobile computing device behaviors by identifying a critical data resource that requires close monitoring, identifying an intermediate resource associated with the critical data resource, monitoring API calls made by a software application when accessing the critical data resource and the intermediate resource, identifying mobile computing device resources that are consumed or produced by the API calls, identifying a pattern of API calls as being indicative of non-benign activity by the software application, generating a light-weight behavior signature based on the identified pattern of API calls and the identified mobile computing device resources, using the light-weight behavior signature to perform behavior analysis operations, and determining whether the software application is non-benign or benign based on the behavior analysis operations.

In various aspects, the behavior observer module 214 and/or the behavior analyzer module 216 may be configured to analyze mobile computing device behaviors by identifying APIs that are used most frequently by software applications executing on the mobile computing device, storing information regarding usage of identified hot APIs in an API log in a memory of the mobile computing device, and performing behavior analysis operations based on the information stored in the API log to identify mobile computing device behaviors that are inconsistent with normal operation patterns. In an aspect, the API log may be generated so that it is organized such that the values of generic fields that remain the same across invocations of an API are stored in a table that is separate from a table that stores the values of specific fields that are specific to each invocation of the API. The API log may also be generated so that the values of the specific fields are stored in a table along with hash keys to the separate table that stores the values of the generic fields.

In various aspects, the behavior observer module 214 and/or the behavior analyzer module 216 may be configured to analyze mobile computing device behaviors by receiving a full classifier model that includes a finite state machine that is suitable for conversion or expression as a plurality of boosted decision stumps, generating a lean classifier model in the mobile computing device based on the full classifier, and using the lean classifier model in the mobile computing device to classify a behavior of the mobile computing device as being either benign or non-benign (i.e., malicious, performance degrading, etc.). In an aspect, generating the lean classifier model based on the full classifier model may include determining a number of unique test conditions that should be evaluated to classify a mobile computing device behavior without consuming an excessive amount of processing, memory, or energy resources of the mobile computing device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various aspects, the behavior observer module 214 and/or the behavior analyzer module 216 may be configured to use device-specific information, such as capability and state information, of the mobile computing device to identify mobile computing device-specific test conditions in a plurality of test conditions that are relevant to classifying a behavior of the mobile computing device, generate a lean classifier model that includes only the identified mobile computing device-specific test conditions, and use the generated lean classifier model in the mobile computing device to classify the behavior of the mobile computing device. In an aspect, the lean classifier model may be generated to include only decision nodes that evaluate a mobile computing device feature that is relevant to a current operating state or configuration of the mobile computing device. In a further aspect, generating the lean classifier model may include determining a number of unique test conditions that should be evaluated to classify the behavior without consuming an excessive amount of mobile computing device's resources (e.g., processing, memory, or energy resources), generating a list of test conditions by sequentially traversing the plurality of test conditions in the full classifier model, inserting those test conditions that are relevant to classifying the behavior of the mobile computing device into the list of test conditions until the list of test conditions includes the determined number of unique test conditions, and generating the lean classifier model to include decision nodes included in the full classifier model that test one of the conditions included in the generated list of test conditions.

In various aspects, the behavior observer module 214 and/or the behavior analyzer module 216 may be configured to recognize mobile computing device behaviors that are inconsistent with normal operation patterns of the mobile computing device by monitoring an activity of a software application or process, determining an operating system execution state of the software application/process, and determining whether the activity is benign based on the activity and/or the operating system execution state of the software application or process during which the activity was monitored. In an further aspect, the behavior observer module 214 and/or the behavior analyzer module 216 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is benign, suspicious, or non-benign (i.e., malicious or performance-degrading).

In an aspect, the mobile device 102 may also include a critical data resources module that stores and manages a list of data resources (e.g. address book, camera, etc.) that are susceptible to misuse and/or determined to require close monitoring. The mobile device 102 may be configured to dynamically update/change the list of critical data resources based on feedback from the behavior analyzer module, heuristics, machine learning, historical information, current usage, events or conditions detected in the mobile device, information received from a server, user configuration, and/or other similar criteria, factors, events, or conditions.

In a further aspect, the mobile device 102 may also store a list of intermediate resources that are determined to require monitoring in order to keep track of the usage of a critical resource. For example, when a software application reads information from a critical resource of the mobile device (e.g., an address book, etc.) and writes the information to a generic file, the mobile device 102 may determine that the generic file is an intermediate resource that requires monitoring to properly keep track of the critical resource (i.e., the address book). In an aspect, the critical data resources module may store and manage the list of intermediate resources.

In an aspect, the mobile device 102 may be configured to monitor API calls at various levels of the software stack that relate to critical resources (e.g., resources identified in the critical data resources module). This may be accomplished by collecting behavior information from instrumented components relating to the critical resources and/or by reading information from API logs generated by the critical resources. The mobile device may store this information in an API call behavioral log database, identify additional resources that require monitoring, determine that the continued monitor of a critical resource is not likely to provide useful information, and add or remove resources to the list of data resources stored in the critical data resources accordingly.

In an aspect, the mobile device 102 may be configured to compare and/or analyze information stored in the API call behavioral log database with behavioral specification models to identify suspicious sequences or patterns of API calls that are indicative of a non-benign/malicious activity or behavior, to identify the operations that should be evaluated together as part of a single mobile device behavior, to identify various control flow or data flow parameters that require analysis, to compute distances between sources and sinks, and/or to identify critical resources that require closer monitoring or scrutiny by the behavior analyzer module 216. The mobile device 102 may generate concise and light-weight behavior signatures for each critical resource based on the result of the comparison and/or analysis operations, and send these light-weight behavior signatures to the behavior analyzer module 216 for analysis. The behavior analyzer module 216 may receive and use the light-weight behavior signatures to quickly and efficiently determine the mobile device behaviors or components that require additional, different, or deeper analysis.

Figure 3:
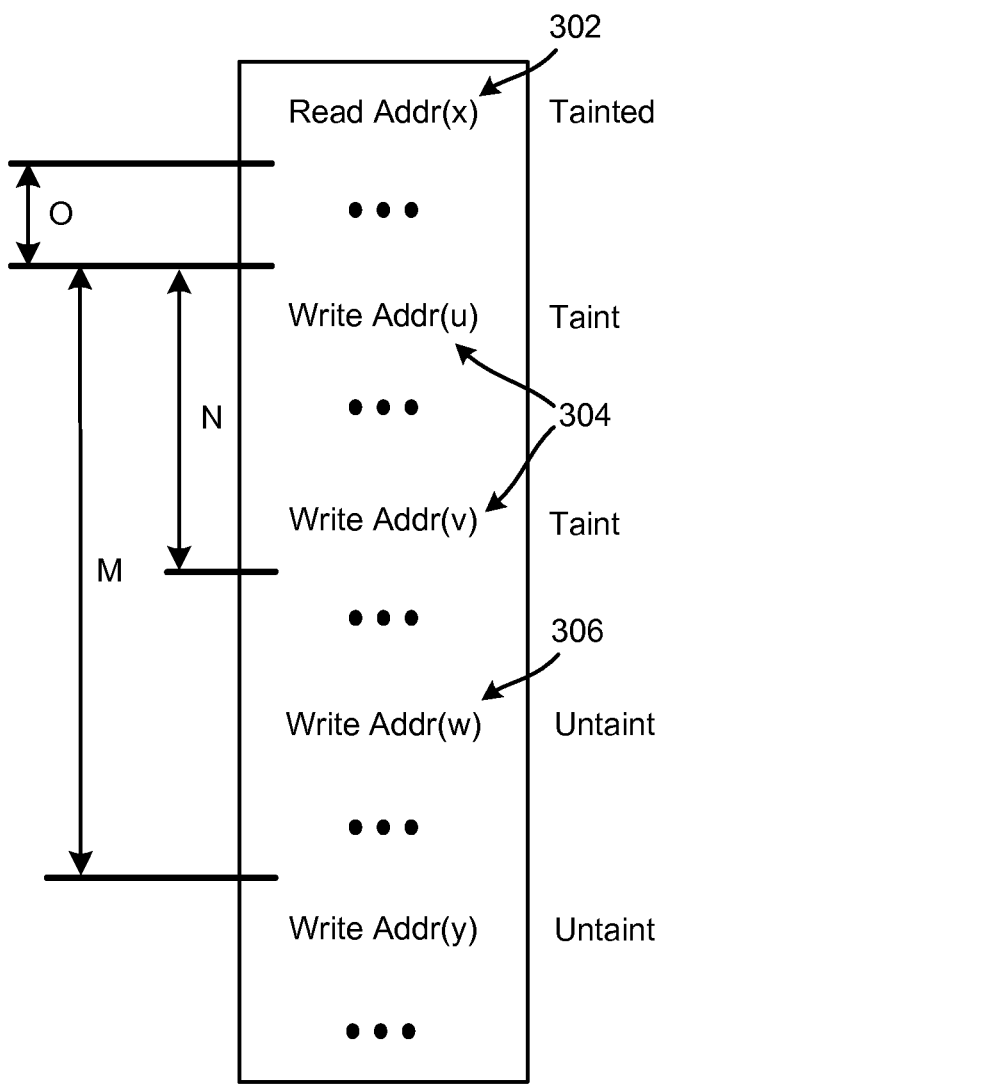
FIG. 3 is an illustration of example memory addresses that could be marked as tainted or untainted by a computing device in accordance with an aspect.

FIG. 3 illustrates that the computing device may identify a read operation 302 associated with a tainted memory address, use a taint propagation heuristic to compute or determine a first number (O), a second number (M), and a third number (N) of operations that should be evaluated, taint the memory addresses associated with the first N write operations 304 performed after the O'th operation and before the M'th operation, and untaint the memory addresses associated with write operations 306 performed after the N'th operation.

Figure 4:
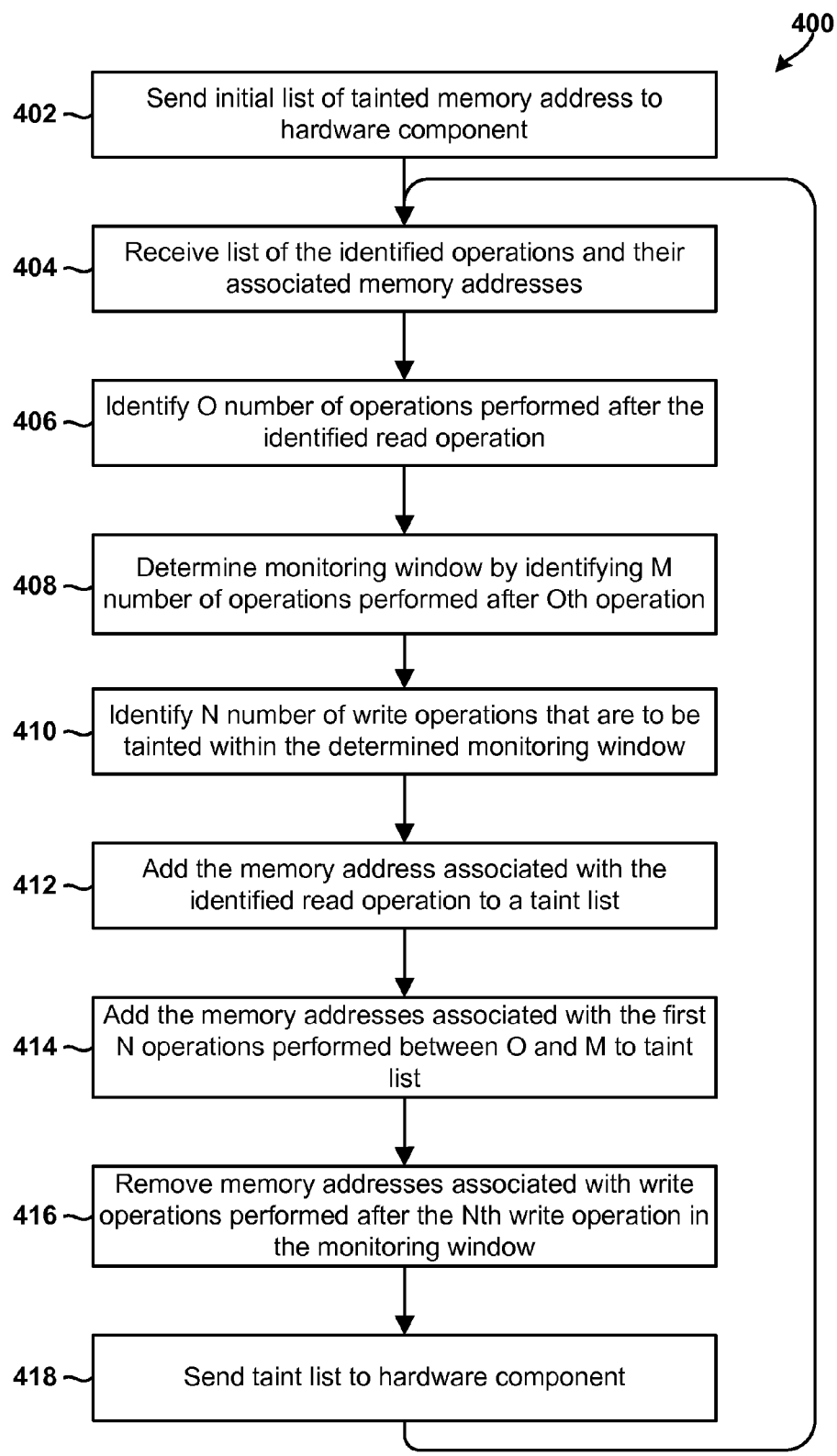
FIGS. 4 and 5 are process flow diagrams illustrating a method of tracking data flows in accordance with an aspect.
Figure 5:
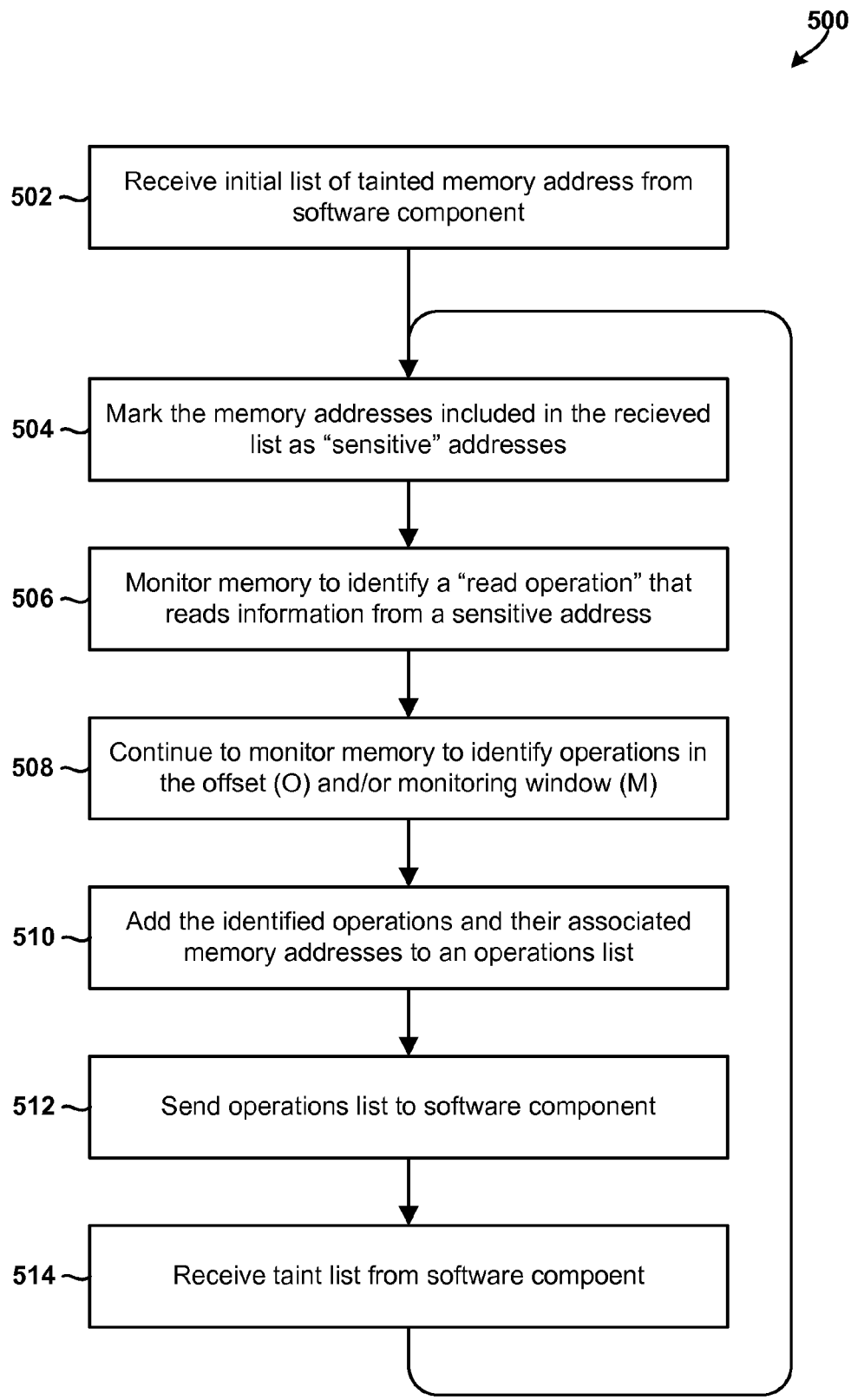

FIGS. 4 and 5 illustrate methods of tracking data flows in a computing device in accordance with the various aspects. In particular, FIG. 4 illustrates an aspect method 400 of using a taint-propagation heuristic to identify memory addresses that involves monitoring in hardware when tracking data flows, and FIG. 5 illustrates an aspect method 500 of monitoring memory in a hardware-based memory monitoring module of the computing device.

In block 402 illustrated in FIG. 4, a processor of the computing device may send an initial list of tainted memory address to a hardware component of the computing device. In an aspect, the hardware component may be a hardware-based memory monitoring module. In block 404, the processor may receive a list of the identified operations and their associated memory addresses from the hardware component. In block 406, the processor may use the information in the received list to compute, determine, or identify an "O" number of operations performed after the identified read operation. In block 408, the processor may determine monitoring window by identifying the M number of operations performed after O'th operation. In block 410, the processor may identify the first "N" number of write operations in the monitoring window (M).

In block 412, the processor may add the memory address associated with the identified read operation to a taint list. In block 414, the processor may add the memory addresses associated with the identified write operations (i.e., the first N write operations in monitoring window M) to the taint list. In block 416, the processor may remove memory addresses associated with write operations performed after the N'th write operation is detected from the taint list. In block 418, the processor may send the taint list to hardware component. Operations in blocks 404-418 may be performed repeatedly or continuously to track data flows without having a significant or negative impact on the performance or power-consumption characteristics of the computing device.

With reference to FIG. 5, in block 502 the hardware-based memory monitoring module of the computing device may receive initial list of tainted memory address from software component of the computing device. In block 504, the memory monitoring module may mark the memory addresses included in the received list as "sensitive" (or "tainted") addresses. In block 506, the memory monitoring module may monitor memory in the computing device to identify a read operation that reads information from a sensitive address. In block 508, the memory monitoring module may continue to monitor memory to identify operations in the offset (O) and/or monitoring window (M). In block 510, the memory monitoring module may add the identified operations and their associated memory addresses to an operations list. In block 512, the memory monitoring module may send the operations list to software component. In block 514, the memory monitoring module may receive a taint list from the software component, and mark the memory addresses included in the received list as sensitive/tainted in block 504.

Figure 6:
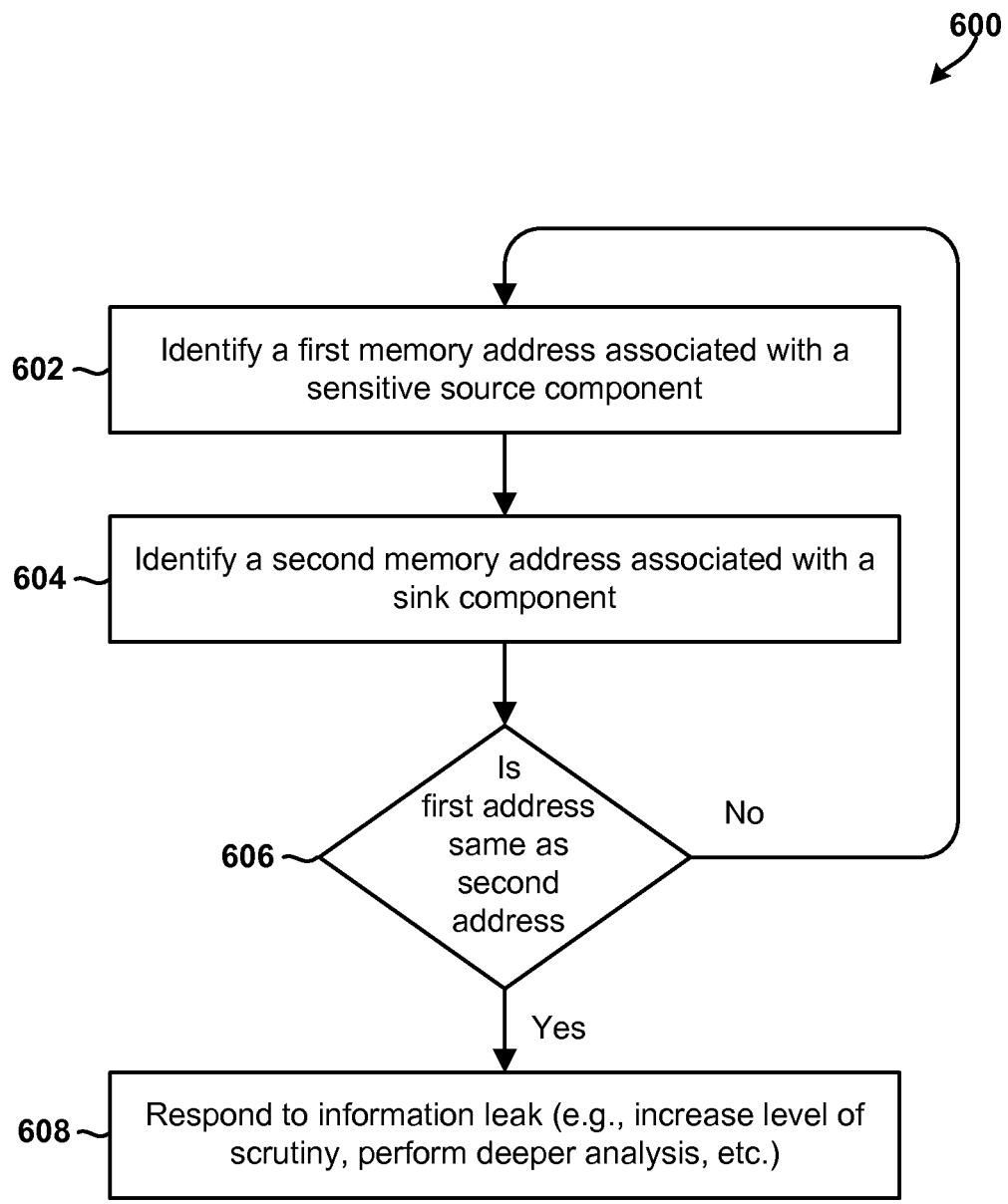
FIG. 6 is a process flow diagram illustrating a method of tracking data flows in accordance with another aspect.

FIG. 6 illustrates an aspect method 600 of tracking data flows in a computing device to quickly and efficiently determine whether an information leak has occurred (or is likely to occur) between a source and sink component. In block 602, a processor or processing core of a computing device may identify a first memory address associated with a sensitive source component. In block 604, the processor may identify a second memory address associated with a sink component. In determination block 606, the processor may determine whether the identified first address is the same as (or equivalent to, etc.) the second memory address. In response to determining that the identified first address is not the same as the second memory address (i.e., determination block 606="No"), the processor may continue its normal behavior-analysis operations and/or identify additional source components in block 602.

In response to determining that the identified first address is the same as the second memory address (i.e., determination block 606="Yes"), the processor may determine that there is an information leak (or that there is a high probability that an information leak will occur) and perform various operations to respond to the information leak in block 608. For example, in block 608, the processor may quarantine software application programs associated with the source or sink components, increase the number of factors/features/behaviors monitored by the behavior observer module 214, cause the behavior analyzer module 216 to use larger or more robust classifier models, etc.

Figure 7:
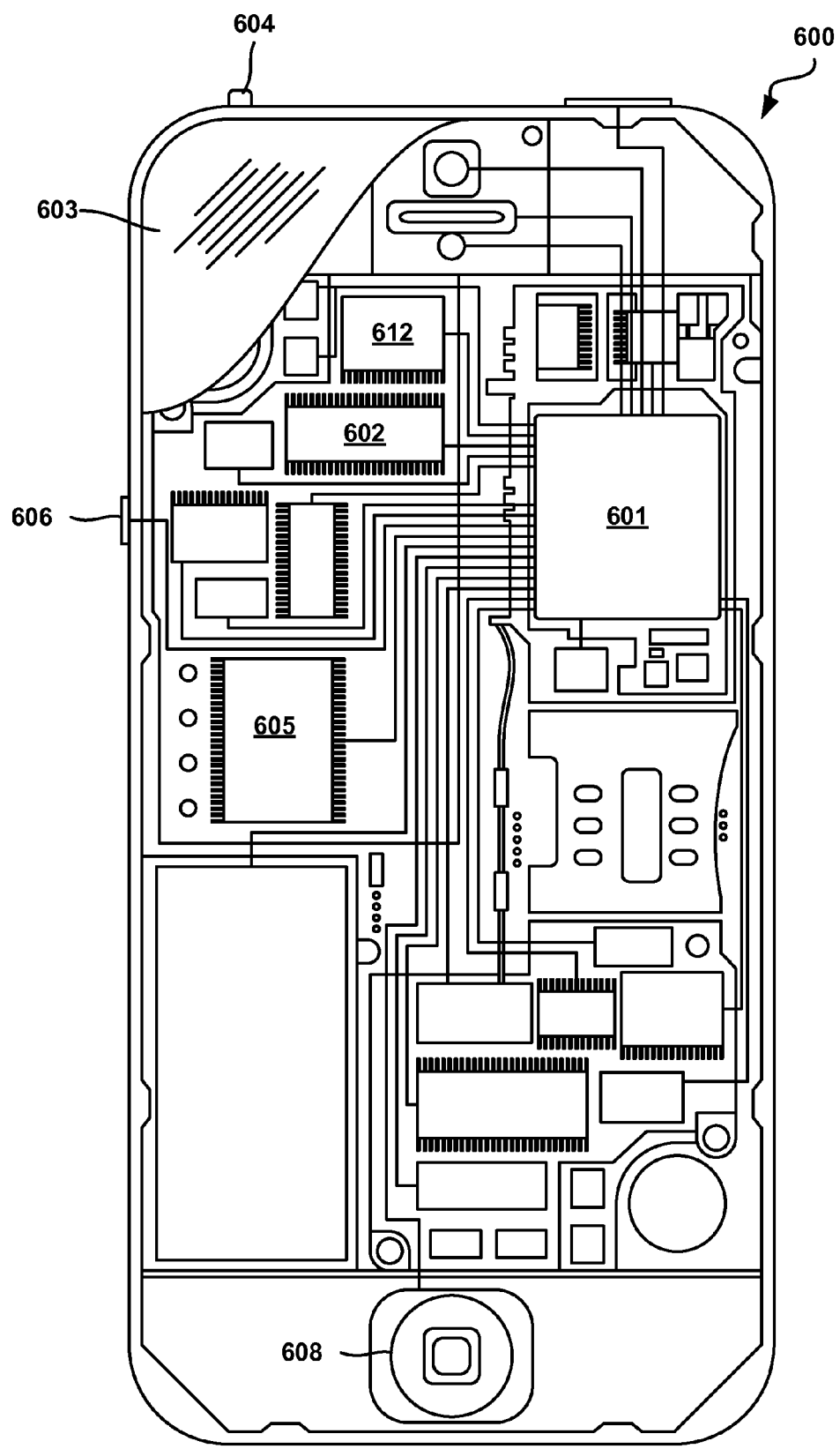
FIG. 7 is an illustration of an example mobile device suitable for use with the various aspects.

The various aspects (e.g., the aspect described above with reference to FIGS. 1 through 6) may be implemented on a variety of mobile computing devices, an example of which is illustrated in FIG. 7 in the form of a smartphone. A smartphone 700 may include a processor 701 coupled to internal memory 702, a display 703, and to a speaker. In an aspect, processor-executable instructions for configuring the processor 701 perform operations of one or more of the aspect method operations described above may be stored in the memory 702. Additionally, the smartphone 700 may include an antenna 704 for sending and receiving electromagnetic radiation that may be connected to a wireless data link and/or cellular telephone transceiver 705 coupled to the processor 701. Smartphones 700 typically also include menu selection buttons or rocker switches 706, 708 for receiving user inputs.

A typical smartphone 700 also includes a sound encoding/decoding (CODEC) circuit 712, which digitizes sound received from a microphone into data packets suitable for wireless transmission and decodes received sound data packets to generate analog signals that are provided to the speaker to generate sound. Also, one or more of the processor 701, wireless transceiver 705 and CODEC circuit 712 may include a digital signal processor (DSP) circuit (not shown separately).

The processor 701 may be any programmable microprocessor, microcomputer or multiple processor chip or chips that can be configured by software instructions (applications) to perform a variety of functions, including the functions of the various aspects described below. In some mobile devices, multiple processors 701 may be provided, such as one processor dedicated to wireless communication functions and one processor dedicated to running other applications. Typically, software applications may be stored in the internal memory 702 before they are accessed and loaded into the processor 701. The processor 701 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system on chip" (SOC) is used in this application to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used in this application to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used in this application to refer to a system or device that includes two or more processing units configured to read and execute program instructions.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of tracking data flows in a computing device, comprising:
    monitoring memory to identify a read operation that reads information from a tainted memory address;
    determining an offset value (O) that identifies a first number of operations performed after the identified read operation, a monitoring window value (M) that identifies a second number of operations performed after the first number of operations, and an upper boundary value (N) that identifies a third number of operations performed after the first number of operations;
    monitoring operations until one of:
        M operations are performed; and
        N write operations to untainted addresses are identified;
    marking memory addresses associated with identified write operations as tainted; and
    marking memory addresses associated with write operations performed after the Nth operation and memory addresses associated with write operations performed after the Mth operation as untainted.

2. The method of claim 1, further comprising using heuristics to identify the first, second and third number of operations.

3. The method of claim 1, further comprising:
    identifying a software application that reads information from one of the tainted memory addresses; and
    applying behavior information collected in the computing device to boosted decision stumps in a classifier model to determine whether the software application is non-benign.

4. The method of claim 1, further comprising:
    identifying a first software application that reads information from one of the tainted memory addresses; and
    monitoring application programming interface calls made by the first software application.

5. The method of claim 4, further comprising:
    generating a behavior vector information structure based on the monitored API calls;
    applying the behavior vector information structure to a classifier model to generate behavior-based analysis results; and
    using the behavior-based analysis results to determine whether the first software application is non-benign.

6. The method of claim 4, further comprising:
    identifying a second software application that reads information from one of the tainted memory addresses; and
    monitoring application programming interface calls made by the second software application.

7. The method of claim 6, further comprising:
    generating a behavior vector information structure based on a combination of API calls made by the first and second software applications;
    applying the behavior vector information structure to a classifier model to generate behavior-based analysis results; and
    using the behavior-based analysis results to determine whether behavior of the first and second software applications is non-benign.

8. The method of claim 7, wherein generating the behavior vector information structure based on the combination of API calls made by the first and second software applications comprises generating an information structure that characterizes a collective behavior of the first and second software applications.

9. The method of claim 7, wherein generating the behavior vector information structure based on the combination of API calls made by the first and second software applications comprises generating an information structure that characterizes a relationship between the first and second software applications.

10. A non-transitory computer readable storage medium having stored thereon processor-executable software instructions configured to cause a processor of a computing device to perform operations comprising:

monitoring memory to identify a read operation that reads information from a tainted memory address;
determining an offset value (O) that identifies a first number of operations performed after the identified read operation, a monitoring window value (M) that identifies a second number of operations performed after the first number of operations, and an upper boundary value (N) that identifies a third number of operations performed after the first number of operations;
monitoring operations until one of:
M operations are performed; and
N write operations to untainted addresses are identified;
marking memory addresses associated with identified write operations as tainted; and
marking memory addresses associated with write operations performed after the Nth operation and memory addresses associated with write operations performed after the Mth operation as untainted.

11. The non-transitory computer readable storage medium of claim 10, wherein the stored processor-executable software instructions are configured to cause a processor to perform operations further comprising using heuristics to identify the first, second and third number of operations.

12. The non-transitory computer readable storage medium of claim 10, wherein the stored processor-executable software instructions are configured to cause a processor to perform operations further comprising:
identifying a software application that reads information from one of the tainted memory addresses; and
applying behavior information collected in the computing device to boosted decision stumps in a classifier model to determine whether the software application is non-benign.

13. The non-transitory computer readable storage medium of claim 10, wherein the stored processor-executable software instructions are configured to cause a processor to perform operations further comprising:
identifying a first software application that reads information from one of the tainted memory addresses; and
monitoring application programming interface calls made by the first software application.

14. The non-transitory computer readable storage medium of claim 13, wherein the stored processor-executable software instructions are configured to cause a processor to perform operations further comprising:
generating a behavior vector information structure based on the monitored API calls;
applying the behavior vector information structure to a classifier model to generate behavior-based analysis results; and
using the behavior-based analysis results to determine whether the first software application is non-benign.

15. The non-transitory computer readable storage medium of claim 13, wherein the stored processor-executable software instructions are configured to cause a processor to perform operations further comprising:
identifying a second software application that reads information from one of the tainted memory addresses; and
monitoring application programming interface calls made by the second software application.

16. The non-transitory computer readable storage medium of claim 15, wherein the stored processor-executable software instructions are configured to cause a processor to perform operations further comprising:
generating a behavior vector information structure based on a combination of API calls made by the first and second software applications;
applying the behavior vector information structure to a classifier model to generate behavior-based analysis results; and
using the behavior-based analysis results to determine whether behavior of the first and second software applications is non-benign.

17. The non-transitory computer readable storage medium of claim 16, wherein the stored processor-executable software instructions are configured to cause a processor to perform operations such that generating the behavior vector information structure based on the combination of API calls made by the first and second software applications comprises generating an information structure that characterizes a collective behavior of the first and second software applications.

18. The non-transitory computer readable storage medium of claim 16, wherein the stored processor-executable software instructions are configured to cause a processor to perform operations such that generating the behavior vector information structure based on the combination of API calls made by the first and second software applications comprises generating an information structure that characterizes a relationship between the first and second software applications.

19. A computing device, comprising:
a processor configured with processor-executable instructions to perform operations comprising:
monitoring memory to identify a read operation that reads information from a tainted memory address;
determining an offset value (O) that identifies a first number of operations performed after the identified read operation, a monitoring window value (M) that identifies a second number of operations performed after the first number of operations, and an upper boundary value (N) that identifies a third number of operations performed after the first number of operations;
monitoring operations until one of:
M operations are performed; and
N write operations to untainted addresses are identified;
marking memory addresses associated with identified write operations as tainted; and
marking memory addresses associated with write operations performed after the Nth operation and memory addresses associated with write operations performed after the Mth operation as untainted.

20. The computing device of claim 19, wherein the processor is configured with processor-executable instructions to perform operations further comprising:
identifying a first software application that reads information from one of the tainted memory addresses;
monitoring application programming interface calls made by the first software application;
generating a behavior vector information structure based on the monitored API calls;
applying the behavior vector information structure to a classifier model to generate behavior-based analysis results; and
using the behavior-based analysis results to determine whether the first software application is non-benign.

* * * * *